(12) United States Patent
Gyllenskog

(10) Patent No.: US 6,607,130 B2
(45) Date of Patent: Aug. 19, 2003

(54) SYSTEM AND METHOD FOR PRINTING APPLICATION AND PRINTER INDEPENDENT BAR CODES

(75) Inventor: Joel Gyllenskog, Boise, ID (US)

(73) Assignee: MicroWorks, Inc., Boise, ID (US)

( * ) Notice: Subject to any disclaimer, the term of this patent is extended or adjusted under 35 U.S.C. 154(b) by 74 days.

(21) Appl. No.: 09/953,421

(22) Filed: Sep. 14, 2001

(65) Prior Publication Data

US 2003/0052171 A1 Mar. 20, 2003

(51) Int. Cl.$^7$ ............................................. G06K 19/06
(52) U.S. Cl. ............................... 235/462.25; 235/462.15
(58) Field of Search ....................... 235/462.25, 462.01, 235/462.14, 462.15, 454, 494, 436

(56) References Cited

U.S. PATENT DOCUMENTS

| | | | |
|---|---|---|---|
| 5,025,397 A | * 6/1991 | Suzuki | ........................ 364/519 |
| 5,292,202 A | 3/1994 | Swada | |
| 5,939,700 A | * 8/1999 | Ackley | .................. 235/462.01 |
| 6,170,932 B1 | * 1/2001 | Kanaya et al. | ................. 347/41 |
| 6,337,743 B1 | * 1/2002 | Brown et al. | .............. 358/1.13 |

FOREIGN PATENT DOCUMENTS

| | | | |
|---|---|---|---|
| JP | 04190468 | * 7/1992 | ............. G06K/1/12 |
| JP | 09267523 | * 10/1997 | ............... B41J/5/30 |

OTHER PUBLICATIONS

Vault Information Services, "Code 39 Symbology", http://www.barcodeisland.com/code39.phtml, Sep. 12, 2001.
Vault Information Services, "General Symbology Background Information", http://www.barcodeisland.com/sym-info.phtmll, Sep. 12, 2001.

* cited by examiner

*Primary Examiner*—Daniel St.Cyr
(74) *Attorney, Agent, or Firm*—Robert A. Huntsman

(57) ABSTRACT

This invention teaches a system and method for printing bar codes where the bar code logic is encapsulated in a modularized barcode encoder in a host computer, independent from either an associated printer or an associated application program. This novel modularization allows sophisticated and flexible barcode printing from a wide range of applications programs and a wide range of printers where neither the printer nor the application program necessarily has barcode logic. Barcode logic can thus be produced, packaged, and maintained by barcode specialists without requiring changes to either the associated printers or application programs.

16 Claims, 8 Drawing Sheets

SYSTEM AND METHOD FOR PRINTING APPLICATION AND PRINTER INDEPENDENT BAR CODES

BACKGROUND OF THE INVENTION

In modern commercial environments, a marking system generally known as barcodes is frequently used to mark inventory with a product identifier encoded as a printed code consisting of black bars on a white background that can be read and decoded reliably by an inexpensive scanner. There are numerous uses for barcodes. One common application is marking products for retail sale with an appropriate barcode. The barcode is later scanned at a point of sale terminal. The scanner and associated computer decode the product identifier from the barcode, and then use the decoded product identifier to look up the price and product name and description from a computerized database, which is then input directly into the point of sale terminal. The information thus received can printed on the customers sales receipt, and can be used for inventory accounting and other related purposes.

Most barcodes tend to look alike to a human observer. The encoded information in a barcode is generally stored in the width of adjacent black bars on a white background. The width of the bars and space between the bars varies widely. A human observer is not able to easily see such variations in width, but electronic scanners, in conjunction with a computer, can accurately read and decode barcodes. In order to increase the reliability of barcodes systems, redundant information is often encoded in the barcode so that the reading system has additional information that can be used to verify that a reading is accurate.

There are numerous schemes for encoding and decoding barcodes. The different encoding schemes for barcodes are called symbologies. Some symbologies print a barcode in the smallest space possible. Others include varying amounts of redundant data that increases the reliability of accurately reading data at the expense of large printed codes. Well known symbologies include numeric only symbologies including a number of UPC-based symbologies such as UPC-A, UPC-E, EAN-13, EAN-8, Bookland, Code 11, Postnet, and Codabar. Additionally, there are a number of alphanumeric symbologies such as Code 128, Code 39, and Code 93. Alphanumeric symbologies can encode letters as well as numbers.

For a barcode system to work, the device for printing barcodes and the devices to read the corresponding barcodes must agree upon and understand the symbology being deployed. A feature of most symbologies is a special bar pattern for starting and ending a single barcode. Many symbologies also include an additional "check digit", typically printed before the stop code, that the reading/scanning system uses to verify the barcode was read correctly. "Check digit" is typically a single encoded digit, but the term is used here in the general sense to include any kind of redundant characters, including alphanumeric characters and multiple character strings. These check digits are created by a number of different schemes, depending on the rules of the symbology being deployed. Although human manual computation of check digits can be done, it is highly undesirable to do so because such computation is error prone and requires a very technical understanding of the symbology. It is preferable and customary to use a computer to calculate the check digit.

Each set of black bars that represents a single encoded character of a barcode is called a glyph, and a typical glyph is printed by printing a number of adjacent black bars, accurately spaced with a predetermined amount of white space, according to the symbology being deployed. Historically, barcodes needed to be printed with special printing devices, but modern computing devices, including laser and inkjet printers now have sufficient printing capabilities to print high quality barcodes. Numerous modern computer applications on popular computer systems can now print barcodes for reading by a suitable device. Unfortunately, because of the large number of symbologies, most applications do not support all symbologies, and many application programs do not directly support any symbology. A limited number of applications provide extensive barcode support, but such applications tend to be expensive and difficult to maintain because of the complexity and variety of symbologies. A larger number of applications support partial encoding in an indirect manner. Typically, such programs allow usage and specification of data rendered in various fonts supported by a particular printer. Special bar code fonts are available. Applications can specify that a particular string (the product identifier) is to be rendered in the special bar code font. The scheme requires the user of the application to explicitly select a barcode font available on an associated printer and then explicitly provide the start character, the stop character, and the check digit in the barcode font.

Because of the complexity of barcode encoding, it is desirable to separate the bar encoding technology from the application program. Such modularity allows the barcode encoding technology to be provided by one entity having the requisite knowledge of barcode technology, and the application logic to be provide by another entity having the requisite knowledge for the particular application. Thus as new symbologies are invented, the barcode module can be updated without requiring the application developer to modify the application. Furthermore, this modularity allows application users to limit the supported symbologies to a specific subset of available symbologies; this can lead to both a reduction in complexity and a reduction in cost, since there is generally additional cost in providing support for numerous symbologies.

There are at least three well known schemes for separating application program logic from barcode logic. The first is to provide a barcode font, and then rely on the user of an application to select the barcode font, and explicitly provide any required start characters, stop characters, or check digits. A commercial example of this scheme is Altek Bar Code TrueType fonts by ABC Fonts.

The second scheme is to provide a separate barcode encoder tool, typically a separate program on the host computer. In this scheme, the product identifier is entered into the barcode encoder tool either manually or through a textual cut-and-paste operation. The barcode encoder tool then encodes the product identifier into the corresponding barcode, the resulting barcode must be transferred back into the main application program, typically through a cut-and-paste operation. This scheme is undesirable because it is cumbersome and it requires human intervention between the application and barcode program. A commercial example of a product deploying this scheme is Bars and Stripes by a company of the same name.

A third scheme is to provide a barcode encoder in a printer. This scheme requires a predefined barcode font to be installed on the printer. This scheme has a significant advantage over the other schemes—the barcode encoding is done automatically without human intervention. In particular, start characters, stop characters, and check digits are all provided automatically by the encoder in the printer. This scheme is limited to environments having printers so equipped and having the necessary barcode fonts. Many popular printers, such as Hewlett Packard laser printers, provide a slot for a DIMM, a custom memory chip that allows the capabilities of a printer to be expanded by a third party. DIMM's have been created to provide knowledge of certain symbologies for certain printers, thus providing easier barcode encoding for applications in that environment. Unfortunately, not all printers can be enhanced in this manner, and creating such a DIMM is very technical, usually requiring computer programming for the native processor of the particular printer. Of course, there is considerable cost to having a barcode enhanced printer. A commercial example of this scheme is Hewlett-Packard printers that provide for external DIMM's; the DIMM's themselves are provided by third parties such as JetCAPS.

What is needed is the ability to provide modularized barcode encoding technology in a manner independent of either application programs or printers such that barcodes, including the start character, stop character and check digit can be encoded automatically without human intervention.

BRIEF SUMMARY OF THE INVENTION

The present invention overcomes the limitations of the prior art by teaching a novel bar encoding method and system that allows barcode encoding technology to be added to the host computer, independent of either the application or the printer technology. In the preferred embodiment, the technology is deployed using a print monitor in the Microsoft Windows family of operating systems. In another embodiment the present invention teaches deployment in a Unix/Linux print daemon. Although the technology is useful in these two embodiments, the technology is not limited to them. Rather the technology is deployable in any host computer having an operating system that allows print data between an application program and the printer to be examined and modified.

DETAILED DESCRIPTION OF THE INVENTION

Figure 1:
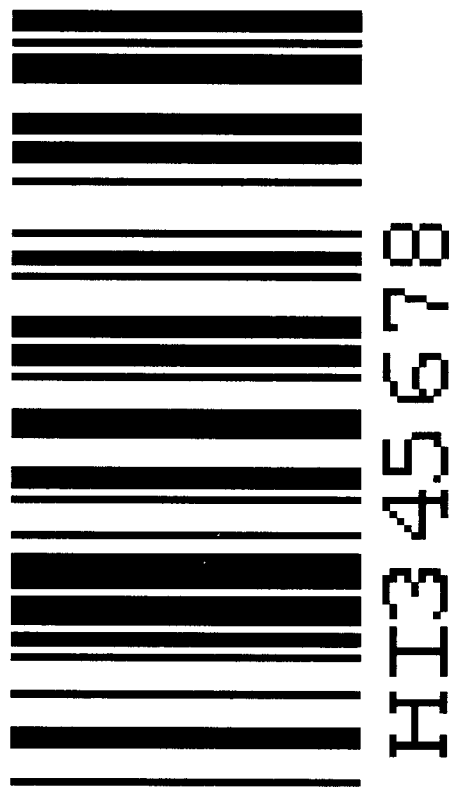
FIG. 1 illustrates a printed barcode.
Figure 1:
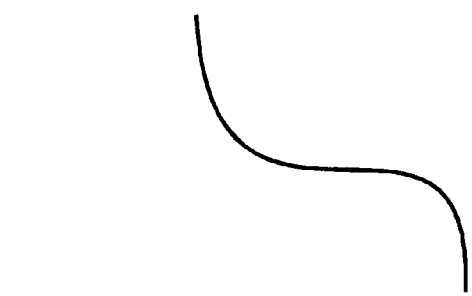
Figure 2:
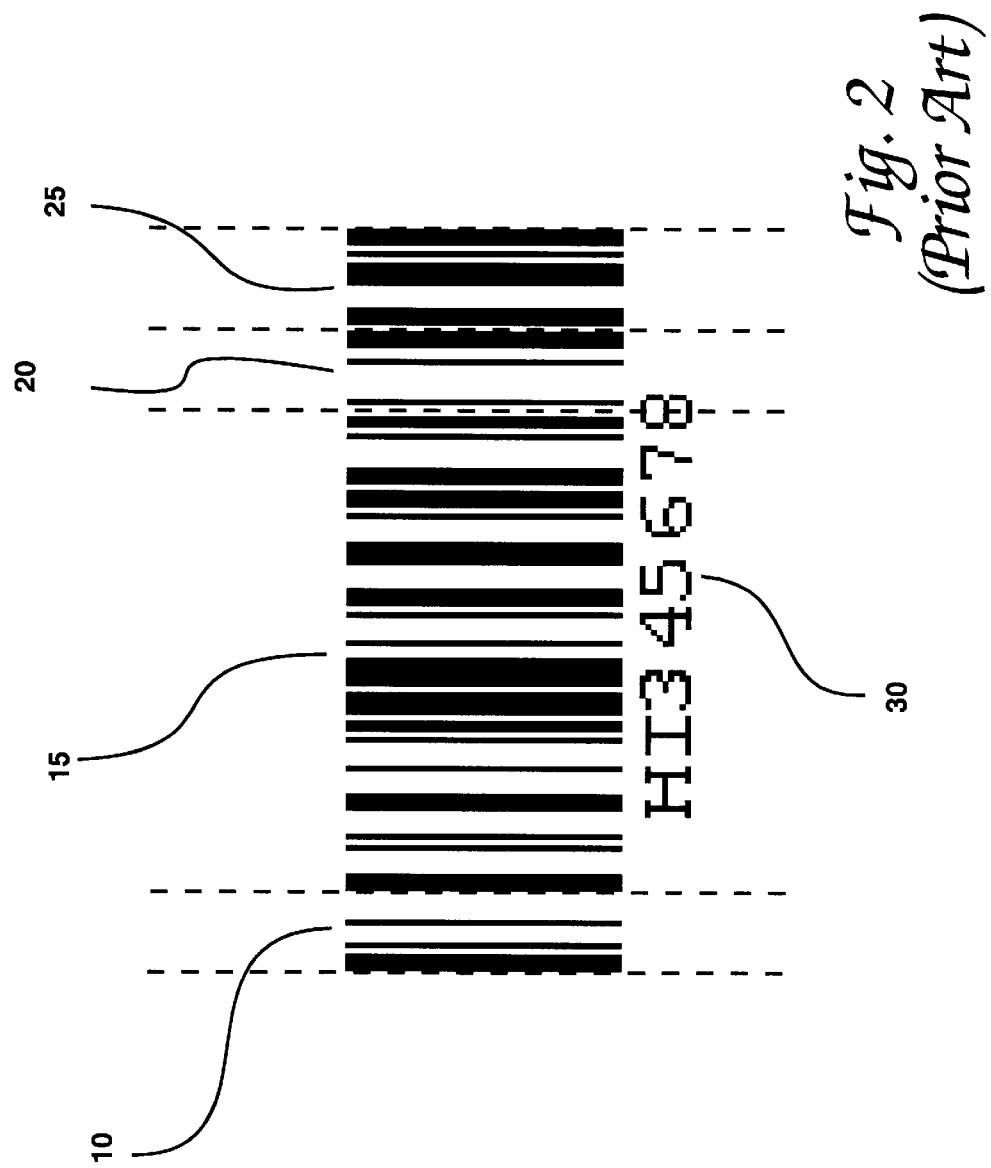
FIG. 2 illustrates the barcode of FIG. 1 with additional markings to illustrate typical components of a bar.

The invention relates to encoding and printing barcodes from generic computer applications including applications with no explicit barcode support such as a word processor or a spreadsheet program. To better understand the invention, it is helpful to understand the parts of a typical barcode. FIG. 1 shows a rendition of the alphanumeric string "HI345678" rendered as a barcode 5 using the symbology known as "Code 128". For illustrative purposes, the identifier to be encoded will be referred to as a "product identifier" although the identifier is not limited to product identifiers—it can be any alphanumeric identifier supported by a particular symbology. FIG. 2 illustrates the same encoded barcode divided into sections with illustrative dotted lines to illustrate different sections found in a typical barcode rendition. FIG. 2 illustrates a start character 10, the actual encoding of the identifier "HI345678" 15, a checksum digit 20 and a stop character 25. The product identifier 30, although not a part of the barcode, is sometimes rendered with the barcode for the benefit of human beings who typically cannot read barcodes unassisted.

An application typically produces the product identifier to be encoded—in this example the product identifier is "HI345678". The product identifier may come from a database, or user input for example. In order to understand the present invention, it is helpful to understand certain aspects of prior art implementations.

Figure 3:
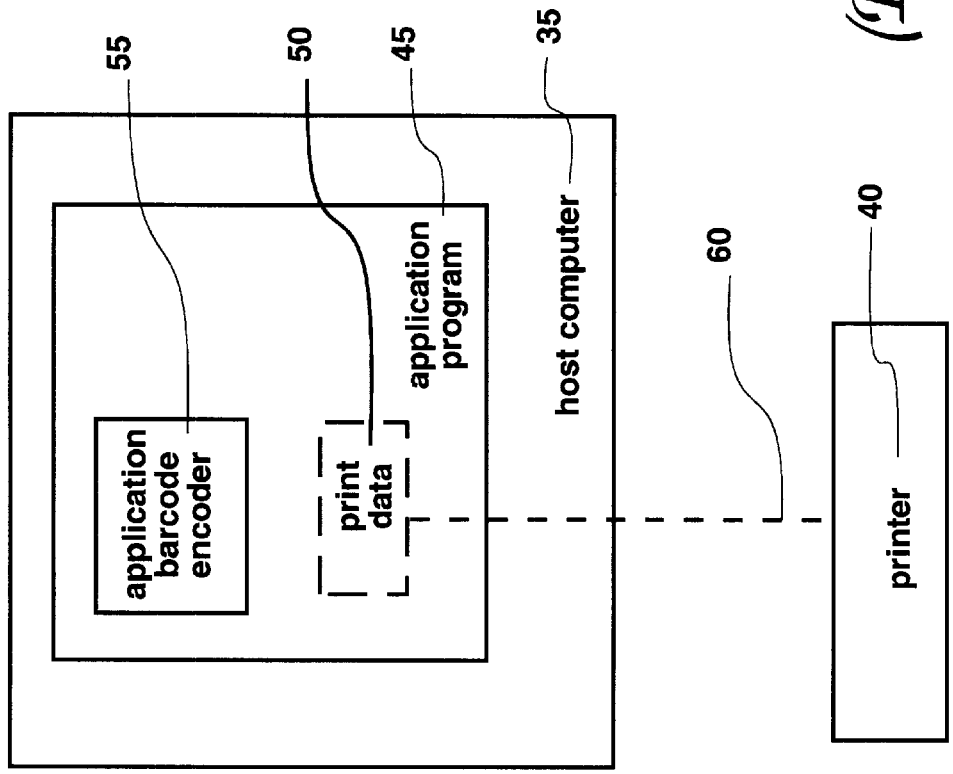
FIG. 3 illustrates a system for printing barcodes where barcodes are encoded in an application program according to the prior art.

FIG. 3 shows how the product identifier would be encoded using prior art teachings in which the application program has built-in barcode knowledge. Referring to FIG. 3, such a system includes a host computer 35 and a printer 40; the host computer 35 includes an application program 45 containing print data 50 and a barcode encoder 55 that is part of the application program 45. In such an application, product identifiers to be encoded are identified by the logic of the application program 45. Such product identifiers are then processed to produce appropriate print data 50 that encodes the product identifier and renders the desired barcode when the print data is printed by the printer 40. The dotted line 60 indicates the data path of the print data 50 to the printer 40. In such prior art systems only symbologies contained in the application program logic can be encoded, thus additions to new symbologies requires modification of the application program 45.

Figure 4:
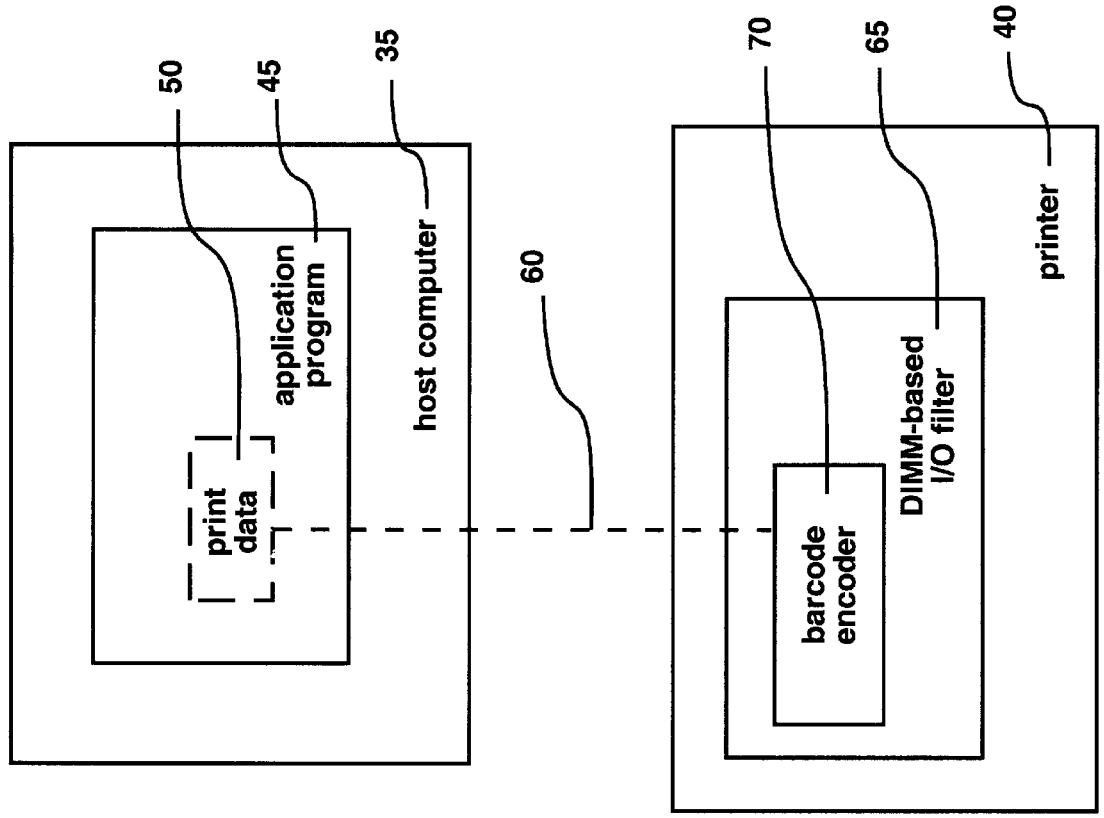
FIG. 4 illustrates a system for printing barcodes where barcodes are encoded in the printer according to the prior art.

FIG. 4 illustrates another prior art implementation. Referring to FIG. 4, the printer 40 contains a DIMM-based I/O filter 65 in which contains a barcode encoder 70. Such systems typically work by monitoring the print data for special fonts that are to be encoded as barcodes. This implementation is often more expensive than the implementation of FIG. 3 because an additional chip, the DIMM, must be included and programmed for the particular printer and the particular symbology.

Figure 5:
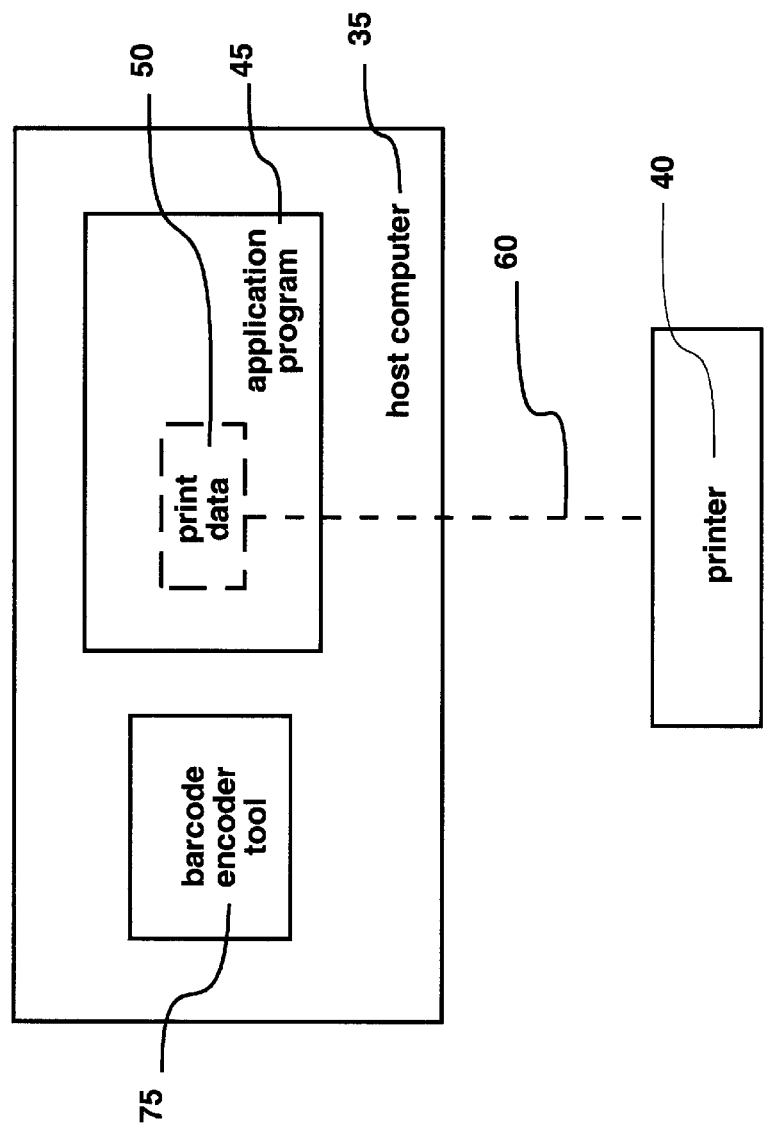
FIG. 5 illustrates a system for printing barcodes where barcodes are encoded in a host-based barcode encoder tool apart from the application program according to the prior art.

FIG. 5 illustrates another prior system where a barcode encoder tool 75, separate from any application program 45. In such systems, tools are used to generate barcodes, including start character, stop characters, and check digits. The resulting barcode is then typically transferred to the application using cut-and-paste.

Figure 6:
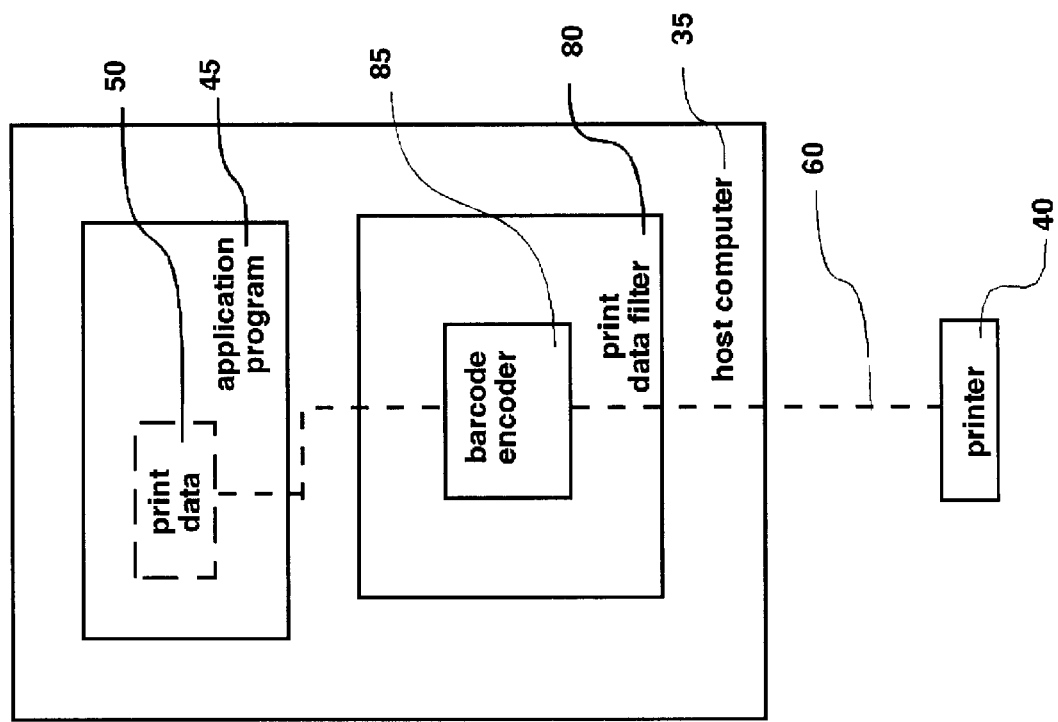
FIG. 6 illustrates a system for printing barcodes where barcodes are encoded in a print data filter according to the present invention.

FIG. 6 illustrates one embodiment of the present invention. Referring to FIG. 6, the host computer 35 contains a print data filter 80 which in turns contains the barcode encoder 85. Unlike systems depicted in FIG. 3, the barcode logic is not tied to any particular application program and will work with a large number of application programs. Unlike the system of FIG. 4, which requires modification to the printer, the barcode encoder 85 of the present invention as depicted in FIG. 6 resides on the host computer 35, thus making it compatible with a large number of printers 40, including printers not equipped with barcode fonts. Unlike the system of FIG. 5, the present invention deployed in FIG. 6 does not require the barcode tool 75 of FIG. 5 and does not require cut-and-paste to get a barcode in the application program. Instead, the barcode encoder 85 of the present invention as depicted in FIG. 6 is deployed within a print data filter 80, where the barcode encoder 85 can examine and modify print data 50 without human intervention.

Figure 7:
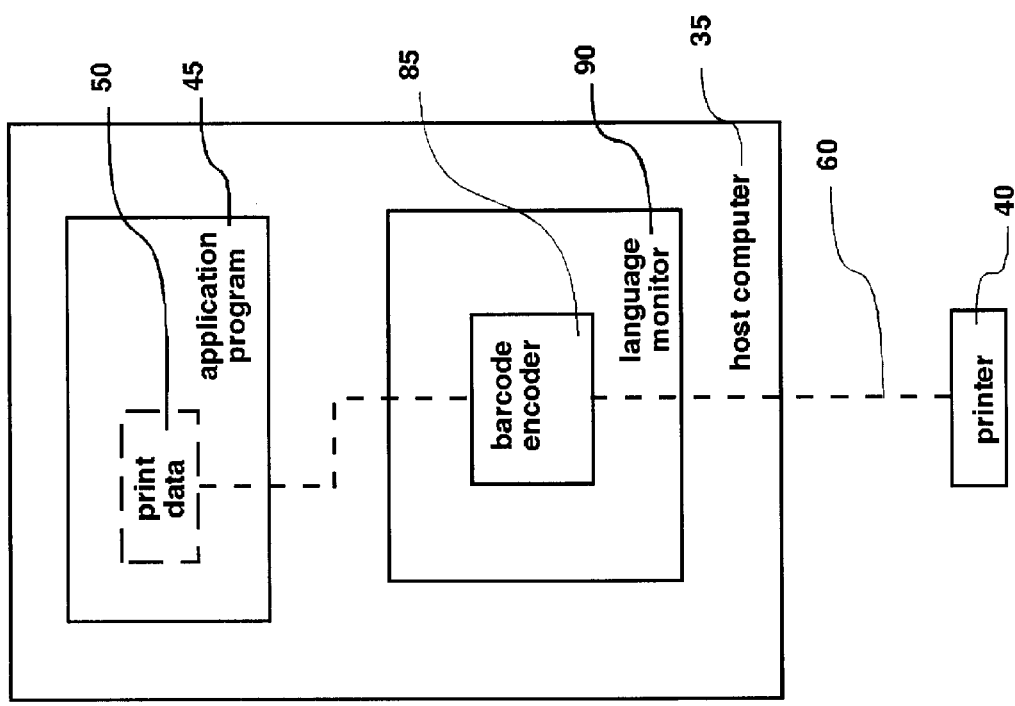
FIG. 7 illustrates a system for printing barcodes where barcodes are encoded in a language monitor according to the preferred embodiment of the present invention.

FIG. 7 illustrates the preferred embodiment of the invention. Referring to FIG. 7, the print data filter 80 of FIG. 6 is implemented as a language monitor 90 of a Microsoft Windows based computer systems including, but not limited to Windows 2000, Windows 95/98/ME and Windows NT and their successors. The Windows operating system allows developers to implement custom print language monitors that can examine and modify print data after it has left the application but before it is transferred to the printer. Thus the language monitor 90 serves as an excellent print data filter because it resides on the host computer 35, is independent from any application program 45, and can examine and modify print data 50 before it reaches the printer 40.

Figure 8:
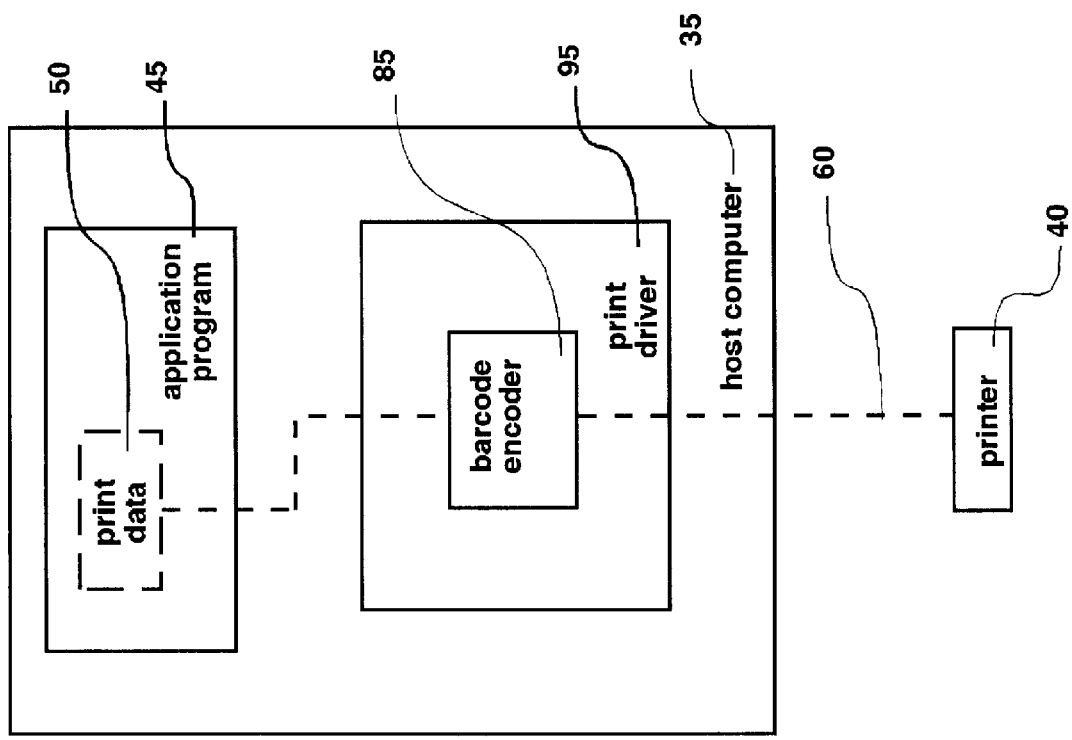
FIG. 8 illustrates a system for printing barcodes where barcodes are encoded in a print driver according to the present invention.

FIG. 8 illustrates another embodiment of the present invention. Referring to FIG. 8, a customized print driver 95 is used as the print driver filter 80. This configuration is useful in operating systems like Linux and UNIX where the print drivers—or print daemons—can be written to process print data before it reaches the printer.

In order for the automatic barcode encoding of the present invention to work, the barcode encoder 85 must be able to detect strings intended to be encoded as barcodes. There are a number of schemes that can be deployed; the preferred embodiment designates a special font as a barcode character font. The print data is parsed looking for font selection codes. When the barcode font is detected, the characters to be rendered in that font are treated as product identifiers. The characters designating the product identifier are removed and replaced with an appropriate character string that will render the appropriate barcode glyphs when the data is printed. This detection and substitution are done automatically without any human interaction. The replacement characters are not limited to a bar code font; they can be any character or graphic from any font, including fonts having drawing characters, that are capable of producing the barcode glyphs required by the particular symbology.

The particular embodiments shown are included by way of illustration rather than limitation. As one skilled in the art will appreciate, the invention is useful in environments beyond those illustrated. In particular, as operating systems evolve, various implementations of print data filters may be deployed in various configurations within the host computer without violating the spirit of the invention. Likewise the implementation of the barcode encoder may deploy a variety of schemes to detect product identifiers with the print data produced by the application program, and can encode them for rendition on the target printer in a number of ways not shown without violating the spirit of the invention. The invention is limited only by the claims as set forth below.

I claim:

1. A method for producing barcodes in a computing environment wherein the computing environment includes a host computer and a printer, the host computer further includes an application program having print data, the print data includes a first character string from the application program, the printer having the capability to print barcode glyphs, the printer is interfaced to the host computer wherein the printer can receive print data and render the data in print form, the method comprising the steps of:

associating a print data filter with the host computer, the host computer includes the print data filter, wherein the print data filter monitors said print data, associating a print data receiver with the print data filter, the print data filter includes the print data receiver, wherein the print data receiver receives said print data from said application program, associating a barcode parser with the print data filter, the print data filter includes the barcode parser, wherein the barcode parser locates said first character string in the print data, associating a barcode translater with the print data filter, the print data filter includes the barcode translater, wherein the barcode translater determines a second character string, wherein the second character string, when printed, renders a barcode corresponding to the first character string, associating a barcode substituter with the print data filter, the print data filter includes the barcode substituter, wherein the barcode substituter modifies the print data by substituting the second character string for the first character string in the print data, associating a barcode transmitter with the print data filter, the print data filter includes the barcode transmitter, wherein the barcode transmitter transmits the modified print data, wherein the second character string is printed, rendering a barcode corresponding to the first character string.

2. The method of claim 1 wherein the print data filter is a language monitor.

3. The method of claim 1 wherein the print data filter is a print driver.

4. The method of claim 1 wherein the print data filter is a print daemon.

5. A computer-readable medium for producing barcodes in a computing environment wherein the computing environment includes a host computer and a printer, the host computer further includes an application program having print data, the print data includes a first character string from the application program, the printer having the capability to print barcode glyphs, the printer is interfaced to the host computer wherein it can receive print data and render the data in print form, comprising computer executable steps of:

associating a print data filter with the host computer, the host computer includes the print data filter, wherein the print data filter monitors said print data, associating a print data receiver with the print data filter, the print data filter includes the print data receiver, wherein the print data receiver receives said print data from said application program, associating a barcode parser with the print data filter, the print data filter includes the barcode parser, wherein the barcode parser locates said first character string in the print data, associating a barcode translater with the print data filter, the print data filter includes the barcode translater, wherein the barcode translater determines a second character string, wherein the second character string, when printed, renders a barcode corresponding to the first character string, associating a barcode substituter with the print data filter, the print data filter includes the barcode substituter, wherein the barcode substituter modifies the print data by substituting the second character string for the first character string in the print data, associating a barcode transmitter with the print data filter, the print data filter includes the barcode transmitter, wherein the barcode transmitter transmits the modified print data, wherein the second character string is printed, rendering a barcode corresponding to the first character string.

6. The medium of claim 5 wherein the print data filter is a language monitor.

7. The medium of claim 5 wherein the print data filter is a print driver.

8. The medium of claim 5 wherein the print data filter is a print daemon.

9. A system for producing barcodes in a computing environment wherein the computing environment includes a host computer and a printer, the host computer further includes an application program having print data, the print data includes a first character string from the application program, the printer having the capability to print barcode glyphs, the printer is interfaced to the host computer wherein it can receive print data and render the data in print form, comprising:

a print data filter, the host computer includes the print data filter, wherein the print data filter monitors said print data, a print data receiver, the print data filter includes the print data receiver, wherein the print data receiver receives said print data from said application program, a barcode parser, the print data filter includes the barcode parser, wherein the barcode parser locates said first character string in the print data, a barcode translater, the print data filter includes the barcode translater, wherein the barcode translater determines a second character string, wherein the second character string, when printed, renders a barcode corresponding to the first character string, a barcode substituter, the print data filter includes the barcode substituter, wherein the barcode substituter modifies the print data by substituting the second character string for the first character string in the print data, a barcode transmitter, the print data filter includes the barcode transmitter, wherein the barcode transmitter transmits the modified print data, wherein the second character string is printed, rendering a barcode corresponding to the first character string.

10. The system of claim 9 wherein the print data filter is a language monitor.

11. The system of claim 9 wherein the print data filter is a print driver.

12. The system of claim 9 wherein the print data filter is a print daemon.

13. A system for producing barcodes in a computing environment wherein the computing environment includes a host computer and a printer, the host computer further includes an application program having print data, the print data includes a first character string from the application program, the printer having the capability to print barcode glyphs, the printer is interfaced to the host computer wherein it can receive print data and render the data in print form, comprising:

a means for monitoring said print data, executing on the host computer, a means for receiving said print data from said application program, executing on the host computer, a means for locating said first character string in the print data, executing on the host computer, a means for determining a second character string, wherein the second character string, when printed, renders a barcode corresponding to the first character string, executing on the host computer, a means for modifying the print data by substituting the second character string for the first character string in the print data, executing on the host computer, a means for transmitting the modified print data, executing on the host computer, wherein the second character string is printed, rendering a barcode corresponding to the first character string.

14. The system of claim 13 wherein the the host computer further includes a language monitor and the system of claim 13 is included in the language monitor.

15. The system of claim 13 wherein the host computer further includes a print driver and the system of claim 13 is included in the print driver.

16. The system of claim 13 wherein the host computer further includes a print daemon and the system of claim 13 is included in the print daemon.

* * * * *